United States Patent [19]

Cantu et al.

[11] Patent Number: 4,986,354

[45] Date of Patent: * Jan. 22, 1991

[54] COMPOSITION AND PLACEMENT PROCESS FOR OIL FIELD CHEMICALS

[75] Inventors: Lisa A. Cantu; Marvin E. Yost, both of Ponca City, Okla.

[73] Assignees: Conoco Inc., Ponca City, Okla.; E. I. DuPont de Nemours and Company, Wilmington, Del.

[*] Notice: The portion of the term of this patent subsequent to Jan. 22, 2008 has been disclaimed.

[21] Appl. No.: 244,752

[22] Filed: Sep. 14, 1988

[51] Int. Cl.$^5$ ............... E21B 43/16; E21B 41/02; E21B 37/06
[52] U.S. Cl. ............... 166/279; 166/310;371;922; 252/8.551; 252/8.552; 252/8.553; 252/8.555; 428/402.21; 428/402.24
[58] Field of Search ............... 252/8.551, 8.552, 8.553, 252/8.555; 166/279, 310, 371, 902; 428/402.21, 402.24

[56] References Cited

U.S. PATENT DOCUMENTS

| | | | |
|---|---|---|---|
| 2,676,945 | 4/1954 | Higgins | 264/345 X |
| 3,574,132 | 4/1971 | Mosier et al. | 252/316 |
| 3,666,678 | 5/1972 | Mosier et al. | 252/316 |
| 4,272,398 | 6/1981 | Jaffe | 428/402.24 X |
| 4,585,482 | 4/1986 | Tice et al. | 106/15.05 |
| 4,670,166 | 6/1987 | McDougall et al. | 252/8.552 |
| 4,741,401 | 5/1988 | Walles et al. | 252/8.551 X |

FOREIGN PATENT DOCUMENTS 550837 1/1943 United Kingdom .

Primary Examiner—Robert L. Stoll
Assistant Examiner—Gary L. Geist

[57] ABSTRACT

Oil field chemicals are incorporated in microcapsules of the condensation product of hydroxyacetic acid or the co-condensation product of hydroxyacetic acid and other compounds containing hydroxy-, carboxylic acid-, or hydroxycarboxylic acid moieties. The microcapsules are then introduced into an oil well bore and/or subterranean oil formation where the microcapsules dissolve over a period of time and release the oil field chemicals.

9 Claims, No Drawings

COMPOSITION AND PLACEMENT PROCESS FOR OIL FIELD CHEMICALS

BACKGROUND AND SUMMARY OF THE INVENTION

Oil contained in the strata of subterranean formations is necessary for maintaining present domestic and industrial activities and for the advancement of science in industry generally.

An ever increasing need exists for greater supplies of oil derived from subterranean formations. Locating such oil bearing formations which are accessible and which produce a fluid in sufficient quantities to be economically operable to meet the needs for such oil is among the more important needs of the world. Also, continued production of oil from such formations for a period of time sufficient to remove a substantial portion of the oil therefrom at a minimum of operating costs and deterioration of equipment is of great importance.

Conditions which adversely affect the production of oil from a well include (1) plugging or blocking of the passageways in the formations leading to the well due to both natural and structural conditions and the deposition of plugging materials brought out during production (e.g. water blocks, emulsions of water and oil, deposition of high boiling constituents of oil and of sand and detritus generally from unconsolidated formations; (2) insufficient pressure to force the fluid through the formation to the well; and (3) corrosion of the well tubing and operating equipment in the well. Treatment of a well as by introducing an oil field chemical into the formation traversed thereby is among the more effective measures employed to increase the rate of production, prolong the producing life, and lessen the deterioration of well equipment.

In accordance with this invention, these objectives are achieved by placing an oil field chemical in microcapsules of the condensation product of hydroxyacetic acid monomer or a co-condensation product of hydroxyacetic acid and compounds containing other hydroxy-, carboxylic acid-, or hydroxycarboxylic acid moieties and thereafter introducing such microcapsules into an oil well bore and/or subterranean oil formation where the oil field chemicals are released as the microcapsules degrade in the presence of moisture to form oil and water soluble products.

DETAILED DESCRIPTION OF THE INVENTION

The polymers used in the microcapsule composition and process of the present invention comprise the low molecular weight condensation product of hydroxyacetic acid with itself or with other compounds containing hydroxy-, carboxylic acid- or hydroxycarboxylic acid moieties. The condensation products are friable solids with a melting point of greater than 65° C. and generally with a degree of crystallinity. They have a number average molecular weight of 200 to 4000 or higher and preferably are oligomers having a number average molecular weight of about 200 to about 650. They are primarily trimers up through decamers. They are insoluble in both aqueous and hydrocarbon media but will degrade at specific rates in the presence of moisture and temperatures above about 50° C. to form oil and water soluble monomers and dimers. The rate of hydrolysis of the polymers at a given temperature can be increased by incorporating small amounts of other molecules (usually up to about 15% by weight) into the hydroxyacetic acid condensation reaction. These materials are usually flexible or more bulky molecules that partially disrupt crystallinity but leave the condensation product friable. Thus, the polymer can be tailored to adjust the rate of hydrolysis from a few hours to several days by controlling the amount and nature of the crystallinity.

The compounds containing the moieties with which the hydroxyacetic acid is co-condensed include but are not limited to lactic acid, tribasic acids such as citric acid, dibasic acids such as adipic acid, and diols such as ethylene glycol and polyols. They also include difunctional molecules such as 2,2-(bishydroxymethyl) propanoic acid. Co-condensing hydroxyacetic acid with different molecules produces varied physical and hydrolytic properties, thus permitting the treatment agent to be tailored to the oil well temperatures and treatment timing considerations. Preferred co-condensing molecules are lactic acid, citric acid, 2,2-(bishydroxymethyl) propanoic acid, trimethylol-ethane, and adipic acid. The most preferred are lactic acid and citric acid.

The condensation and co-condensation polymers are made by methods well known in the art. The hydroxyacetic acid may be condensed with itself or with the other co-condensing molecules discussed above in the presence of a catalyst such as antimony trioxide. By varying the percentages of hydroxy acetic acid and the co-condensed compounds as well as the temperatures and time of condensation, it is possible to tailor the condensation product to degrade at different rates for given wellbore temperatures.

The microcapsules used in practicing the invention are formed by any conventional chemical or physical encapsulation method, such as interfacial polymerization or coacervation, as will be evident to those skilled in the art. U.S. Pat. No. 3,577,515 to Vandegaer teaches an interfacial polymerization process which may be used with the condensation and co-condensation polymers employed in carrying out the invention. U.S. Pat. No. 3,577,515 is hereby incorporated by reference.

A wide variety of oil field chemicals are contemplated for use in the microcapsule composition and the process of the invention. They include such materials as corrosion inhibitors to prevent the corrosive attack of metal in oil well equipment, such as, polyamines, diamine salts, polar organic compounds and cationic surfactants; dispersants which act as solvents for paraffin, e.g. nonionic surfactants, such as TRETOLITE PD-10, PD-11 and VY-3857; pourpoint modifiers to inhibit the deposition of paraffinic material both in the channels of the formations leading to the wellbore and in the well tubing and moving parts of the equipment, usually long chain or surface active materials like TRETOLITE CF 2315 and PETROLITE PARID CF; emulsion breaking chemicals to lessen the tendency of water and oil to emulsify, such as, phenol-formaldehyde sulfonate, alkylphenol ethoxylates and polyglycols; wetting agents or surfactants to render the formation more oil wettable or more easily wettable by oil than water; and acids or acid salts such as formic acid and ammonium sulfate for the dissolution of calcium carbonate-containing formations. Also included are scale inhibitors for preventing the deposition of scale in the wellbore and formation, such as phosphonates, polyacrylates and polysulfonates; bactericides, like strong bases and aldehydes, such as glutaraldehyde and acrolein; cement additives, such as retarders and accelerators; frac fluid cross linkers, such as titanates and borates; chemical and radioactive tracers, such as various salts and radioactive salts; and asphaltene treatment chemicals, such as alkylphenol ethoxylates and aliphatic polyethers. All of the above and any other chemicals which find application in an oil well bore or an oil containing formation may also be used.

There are a number of advantages in using microencapsulated chemicals. For example, when two or more chemicals are used in a well treatment, the encapsulated forms of the chemicals can be mixed without losing product or encountering a failure due to premature reactions. As the encapsulating material dissolves downhole, the various chemical or chemicals start to work where they are intended to be effective.

Control of the capsules size, and possibly shape, will also help place the chemical where desired. Larger capsules can be utilized on or near the wellbore surface, or primarily in the largest pores. Smaller, micron sized capsules will allow passage into and through reservoir pores to provide effective penetration of the chemical into the reservoir.

Other advantages in using microencapsulated chemicals include more active chemicals reaching the area of interest, longer residual effects of the chemical treatment, safer handling of the chemicals, simpler equipment required for well treatment, reduced costs due to more effective control and lower chemical consumption.

When a co-condensing compound is condensed with the hydroxyacetic acid to form the microcapsules the amount of co-condensing compound used will vary depending on the particular compound used and the rate of hydrolysis which is desired. Usually the co-condensing compound is present in an amount up to about 15% by weight of the polymeric matrix. The amount of oil field chemical incorporated in the microcapsules may be from as low as about 5% by weight of the microcapsules and may constitute up to as much as about 80% by weight.

The microcapsules containing the oil field chemical are usually introduced into the oil well bore and/or subterranean formation in a treatment fluid which may comprise water, oil, xylene, toluene, brines, water-in-oil emulsions or oil-in-water emulsions. The amount of oil field chemical required for a successful treatment will vary widely depending upon the particular chemical used, the size of the formation, the degree of permeability of the formation, the size and wall thickness of the microcapsules and other variables such as wellbore fluid viscosity, etc. However, from about 0.5 to about 5 kg of chemical per 100 barrels of treatment fluid will be sufficient for most applications.

The polymeric materials used in the microcapsules compositions and process of the invention have a number of advantages. The polymers are insoluble in both water and oil and thereby provide an advantageous encapsulation material for introducing chemicals into well bores and subterranean oil formations. In the presence of water at formation conditions they degrade to oil and water soluble materials which do not accumulate in the well or formation. The polymeric materials used are heavier than water and thus, would not be apt to be carried from the formation with produced water or oil. There is always water flow in a formation. However, often there is only a small amount of oil present. Also, the amount of water produced from a formation usually increases with the age of a well. Thus, there is always water present to degrade the polymeric microcapsules at formation conditions.

The following example illustrates the results obtained in carrying out the invention.

EXAMPLE

Oil is produced from a well with a bottom hole temperature of 160° F. and a bottom hole pressure of 2000 psi. The oil production per day is 200 bbls with 100 bbls of formation brine. The produced water contains about 131,000 ppm of total dissolved solids of which 5120 ppm is calcium and 1560 ppm is magnesium. Under the reservoir conditions, as the fluids reach the well bore, calcium carbonate scale is formed. To prevent scale deposits in the well bore and pipes, scale inhibitors are needed at continuous concentrations of 2 ppm. An inhibitor, diethylene triamine pentamethylene phosphonic acid, is encapsulated with hydroxyacetic acid through a condensation process. In the condensation process, an aqueous solution of the diethylene triamine pentamethylene phosphonic acid scale inhibitor and the hydroxyacetic acid is dispersed in kerosene and thoroughly mixed to form hydrophillic colloids containing the diethylene triamine pentamethylene phosphonic acid/hydroxyacetic acid solution. A shell of polymerized hydroxyacetic acid containing inhibitor is formed at the dispersion/medium interface by adding a hydrophobic polymer initiator to the dispersion.

The resulting distribution of microcapsules containing the inhibitor is injected into the oil bearing formation at 2 bbls per minute using 2% KCl as a carrier fluid. After about 10 bbls of 2% microcapsules are injected into the formation, another 10 bbls of 2% KCl brine is injected to displace the capsules away from the well bore. At the formation temperature, the hydroxyacetic acid condensation microcapsules slowly degrade and release the scale inhibitor thus controlling scale formation until all of the inhibitor is produced from the formation.

While the foregoing preferred embodiment of the invention has been described and shown, it is understood that all alternatives and modifications, such as those suggested, and others may be made thereto, and come within the scope of the invention.

We claim:

1. A process for the continuous release of an oil field chemical within a subterranean hydrocarbon bearing formation or wellbore penetrating such formation comprising:
    (a) placing said oil field chemical in a polymeric microcapsule comprising the condensation product of hydroxyacetic acid monomer or hydroxyacetic acid co-condensed with up to 15 percent by weight of other hydroxy-, carboxylic acid-, or hydroxycarboxylic acid-containing moieties, said product having a number average molecular weight of from about 200 to about 4000;
    (b) dispersing such polymeric microcapsules containing such chemical in a wellbore fluid which at ambient conditions is a non-solvent for such polymeric microcapsules and contained chemical; and
    (c) introducing said wellbore fluid containing said microcapsules into a wellbore or subterranean formation through a wellbore; then
    (d) allowing water and temperature at formation conditions to degrade said microcapsules to form water soluble and oil soluble components; and thereby (e) continuously releasing said chemical from said degraded microcapsules.

2. The process as described in claim 1 wherein the polymeric material has a number average molecular weight of from about 200 to about 650.

3. The process as described in claim 2 wherein the microencapsulated chemical is at least one chemical selected from the group consisting of scale inhibitors, corrosion inhibitors, surfactants, bactericides, paraffin dispersants, pourpoint modifiers, cement additives, fracture fluid cross linkers, emulsion breaking chemicals, chemical tracers, radioactive tracers, and asphaltene treatment chemicals.

4. The process as described in claim 3 wherein the chemical is placed in microcapsules comprising the condensation product of hydroxyacetic acid with at least one co-condensing compound selected from the group consisting of citric acid, lactic acid, trimethylolethane, 2,2-(bishydroxy-methyl) propanoic acid and adipic acid.

5. The process as described in claim 4 wherein the chemical is present in the microcapsules at concentrations of from about 5% to about 80% by weight of the microcapsules.

6. A composition comprising an oil field chemical incorporated in a polymeric microcapsule comprising the condensation product of hydroxyacetic acid monomer or hydroxyacetic acid co-condensed with up to 15 percent by weight of other hydroxy-, carboxylic acid-, or hydroxycarboxylic acid- containing moieties, said product having a number average molecular weight of from about 200 to about 4000.

7. The composition of claim 6 wherein the polymeric material has a number average molecular weight of from about 200 to about 650.

8. The composition of claim 7 wherein the microencapsulated chemical is at least one chemical selected from the group consisting of scale inhibitors, corrosion inhibitors, surfactants, bactericides, paraffin dispersants, pourpoint modifiers, cement additives, fracture fluid cross linkers, emulsion breaking chemicals, chemical tracers, radioactive tracers, and asphaltene treatment chemicals.

9. The composition of claim 8 wherein the chemical is placed in a polymeric microcapsule comprising the condensation product of hydroxyacetic acid with at least one co-condensing compound selected from the group consisting of citric acid, lactic acid, trimethylolethane, 2,2-(bishydroxy-methyl) propanoic acid and adipic acid.

* * * * *